Patented Jan. 30, 1951

2,539,523

UNITED STATES PATENT OFFICE 2,539,523

POLYMERIZATION OF OLEFIN MIXTURES

John C. Reid, Jr., Yeadon, Pa., assignor to The Atlantic Refining Company, Philadelphia, Pa., a corporation of Pennsylvania No Drawing. Application February 14, 1947, Serial No. 728,716

1 Claim. (Cl. 260—80.5)

The present invention relates to the production of copolymers of uniform composition and physical properties from mixtures of dissimilar olefinic compounds, and relates more particularly to the copolymerization of mixtures of olefin hydrocarbons in which the reactivity of one of the components differs substantially from that of the other component or components.

It has been found that in the production of polymers ranging from viscous oils to plastic, rubber-like or even solid materials, the composition and physical properties of the polymer products were difficult to reproduce, and that the composition and properties varied with yield, other things being equal. It was further found that this difficulty was due in a large measure to the difference in reactivity of one or more of the components, and that such difficulty could be obviated by compensating for the difference in reactivity of the components.

For example, in the course of the investigation into the homopolymerization of an olefin such as alpha methyl styrene, it was discovered that a relatively strong, flexible plastic sheeting could be prepared through the copolymerization of alpha methyl styrene, isobutylene, and isoprene, but that the copolymer prepared from a given starting composition was not easily reproducible. Since comparisons of the product of this copolymerization with mechanical mixtures of poly alpha methyl styrene and butyl rubber (isobutylene-isoprene copolymer) demonstrated that the various monomer components were copolymerizing and not polymerizing separately in intimate mixture, it was concluded that the difficulty encountered in duplicating the end product was due to differences in the reactivities of the monomers entering the growing polymer molecule. Such being the case, one of the components would be consumed more rapidly than the others, and as the reaction progressed, the reaction mixture would become increasingly lean in this component, polymerization would then be from a different mixture, and the end product would have a different composition and physical properties.

Therefore, in accordance with the present invention, copolymerization of a mixture of olefins is carried out in such a manner that the most reactive component is constantly replenished as the polymerization reaction progresses, thus permitting the maintenance of a polymerization reaction mixture of substantially constant composition, which in turn yields a polymer product of uniform composition and properties. Since most of the polymerization reactions are influenced by the presence of catalysts which lose their activity during the reaction, additional amounts of catalyst are periodically or continuously introduced throughout the duration of the reaction. The rate of addition of the most reactive component and of the catalyst is, of course, dependent upon the reactivity of the component in the presence of the other component or components, as well as upon the conditions under which the polymerization is carried out and the type of catalyst used, if any. Therefore, in the production of a polymer of desired properties from a given mixture of olefins, the rate of addition of the most reactive olefin and the catalyst must be governed by the individual case.

The method of the present invention is applicable in the copolymerization of any mixture of dissimilar olefinic compounds in which at least one of the components differs substantially in reactivity from the other component or components. While the method of obtaining uniformity of product is particularly adapted to the copolymerization of alpha methyl styrene, isobutylene, and isoprene, many other copolymerizations of polycomponent olefin mixtures may be carried out using the technique of this invention. Such technique is especially adapted for the copolymerization of mixtures of dissimilar olefinic compounds in the presence of solvents or diluents and a Friedel-Crafts catalyst at temperatures below ordinary temperatures (20° C.), and preferably between −10° C. and −150° C. Within this range, the products obtained may vary from viscous, oily materials to solid or rubber-like substances, depending upon the temperature, character and proportions of the olefinic reactants, and the catalyst. Temperatures below −50° C., for example, −75° C. to −130° C., usually produce higher molecular weight products of plastic or rubber-like properties. Various polycomponent mixtures may be employed, such components being exemplified by the alpha alkyl styrenes including alpha methyl styrene, alpha ethyl styrene, alpha propyl styrene, alpha methyl para methyl styrene, alpha methyl para ethyl styrene, alpha methyl para propyl styrene, and other nuclearly substituted alpha styrenes such as the methyl, ethyl, and propyl substituted alpha ethyl and propyl styrenes. The iso-olefin components may be represented by isobutylene, isoamylene, isohexylene, isoheptylene, isooctylene, etc., and the conjugated diolefin components may be exemplified by 1, 3 butadiene, alpha methyl butadiene (piperylene), beta methyl butadiene (isoprene), di-isopropenyl, 1, 1, 3 trimethyl butadiene, hexadiene, and octadiene.

In general, the ratio of conjugated diolefin to the other components should not be greater than about 1:1 in a 3-component system, for example, in an alpha methyl styrene, isobutylene, butadiene mixture, the amount of butadiene should not exceed that of the two remaining components, and in an alpha methyl styrene, isobutylene, isoprene mixture, the isoprene should not exceed 20% of the entire mixture. The ratio of alpha alkyl styrene to iso-olefin may be varied as desired. In the production of copolymers of alpha methyl styrene, isobutylene, and isoprene, good results are obtained with mixtures comprising 10% to 30% alpha methyl styrene, 1% to 20% isoprene, and the balance isobutylene. However, in a 2-component system, for example, isobutylene-butadiene, or isobutylene-isoprene, or alpha methyl styrene-butadiene, or alpha methyl styrene-isobutylene, the ratio of the components may be varied as desired, depending upon the properties required in the copolymer product. In the copolymerization of alpha alkyl styrene, iso-olefin, conjugated diolefin mixtures, the alpha alkyl styrene is the most reactive component and must be replenished as the polymerization progresses, whereas in the copolymerization of iso-olefins with conjugated diolefins, the former component appears more reactive and must be replenished to maintain a reactant mixture of substantially constant composition.

In carrying out the polymerization, dilution of the reactants with a mutual solvent or diluent is most advantageous. Solvents or diluents include the lower alkyl halides such as methyl, ethyl, propyl, and isopropyl chlorides, or the corresponding bromides, iodides, and fluorides, chloroform, carbon disulfide, ethane, propane, butane, ethylene, propylene, and the normal butenes and petroleum naphtha. The quantity of solvent or diluent may range from 0.5 to 25 volumes per volume of the reactants, and in most cases from 1 to 15 volumes of solvent will suffice. In utilizing the normally gaseous solvents at temperatures approaching the upper limits for the polymerization reaction, e. g., 0° C. to −10° C., superatmospheric pressure must be applied to maintain them in the liquid state. However, when polymerization is carried out at −50° C. to −150° C. less pressure, or in some cases, no pressure is required due to the low temperatures involved.

In operating with active Friedel-Crafts type catalysts, it has been found advantageous to first dissolve or disperse the catalyst in a suitable solvent, such as carbon disulfide or a lower alkyl halide, for example, methyl chloride, ethyl chloride, propyl chloride, or iso-propyl chloride before bringing it into contact with the olefinic mixture to be polymerized. The catalyst solution is most suitably applied in the form of droplets or as a mist or dispersion. Any suitable spraying or atomizing device having jets or orifices of proper restriction may be employed to produce the spray or mist, which may be injected on or under the surface of the reactant mixture. In general, any alkyl halide of suitable freezing point and solvent power may be used as a catalyst solvent, although chlorides are preferred over the corresponding bromides, iodides, and fluorides. Various Friedel-Crafts type catalysts may be satisfactorily employed, including $AlCl_3$, $AlBr_3$, $ZnCl_2$, $TiCl_4$, $SnCl_4$, and $BF_3$, preference being had for $TiCl_4$ since it is more soluble in the various solvents, and particularly carbon disulfide, than the other catalysts mentioned.

In the practice of the invention, the desired mixture of dissimilar olefins is made up, preferably with the assistance of a suitable solvent or diluent, and the mixture is cooled by indirect heat exchange with a cooling medium to the temperature at which it is desired to conduct the polymerization. The cooled mixture is then introduced into a suitable reaction vessel provided with a cooling jacket or cooling tubes for maintaining the reaction mixture at the desired temperature. Alternatively, the uncooled olefin mixture may be introduced into the reaction vessel and cooled therein by direct contact with a cooling medium such as solid carbon dioxide, liquefied nitrogen, or liquefied normally gaseous hydrocarbons such as liquefied ethylene. Thereafter, a solution of a catalyst in a solvent such as ethyl chloride or carbon disulfide is made up at ordinary temperature. The concentration of the catalyst in the solution may vary between relatively wide limits, concentrations between 0.25% and 1% being satisfactory, although higher concentrations may be utilized, i. e., up to about 5%. The catalyst solution is then cooled by appropriate means such as by the use of carbon dioxide, or liquefied nitrogen, or liquefied normally gaseous hydrocarbons, for example, ethane, ethylene, or propane to approximately the temperature at which it is desired to carry out the polymerization. The refrigerant used in the cooling of the solution may be applied either externally or internally, but best results have been obtained using the refrigerant externally. Following the cooling operation, the solution in the form of a spray or mist produced by a suitable atomizing device is brought into contact with the olefin mixture to be polymerized. During the polymerization, the reaction mixture is usually kept under constant agitation not only as an aid to temperature control but also to prevent discoloration of the polymer. As the polymerization progresses, additional amounts of the most reactive olefin and of the catalyst are introduced periodically or continuously to maintain a reactant mixture of substantially constant composition. The amount and rate of addition must be determined empirically for any given starting composition, and will vary with the nature of the starting composition, the reactivity of the components, and the temperature. At temperatures of the order of −10° C. to −50° C. the polymer may tend to remain in solution, whereas at temperatures below −50° C., for example, −75° C. to −150° C., the polymer generally forms a slurry of solid particles which may be removed from the reaction mixture by any appropriate means, for example, by decantation or filtration. The complex formed between the catalyst (particularly $AlCl_3$) and the polymer may be decomposed either prior to filtration or subsequently by the addition of agents such as water, or alcohol, or ammonia. The lower aliphatic alcohols such as methyl, ethyl, propyl, and isopropyl are particularly useful in this respect. The polymers may be purified by washing or by steaming to remove unconverted monomers and solvent prior to drying.

The present invention may be further illustrated by the following examples, which, however, are not to be construed as limiting the scope thereof.

An initial olefin charge comprising a total of 400 parts by weight was made up, of which about 87% was isobutylene, 10% was alpha methyl styrene, and 3% was isoprene. The olefin charge was diluted with 1.5 volumes of ethyl chloride, and the mixture was cooled to −110° C. A 1% solution of anhydrous aluminum chloride in ethyl chloride was prepared and cooled to −75° C. The cooled olefin mixture was introduced into a reaction vessel provided with cooling means, and 30 parts by weight of the aluminum chloride catalyst solution was sprayed into the olefin mixture, with vigorous stirring. Polymerization was immediately initiated, and at intervals during which 5% to 10% polymerization was effected, additional catalyst solution and alpha methyl styrene were added, samples of the polymer product being removed at each interval for inspection. In other words, after the initial 10% polymerization (approximate) had occurred, the temperature being held at about −110° C., a sample of the polymer was removed, and immediately thereafter, additional catalyst and alpha methyl styrene were added, and another 10% polymerization was obtained. This was repeated 3 times, the composition of the reactant mixture and the temperature being maintained substantially constant during the entire polymerization. While the operation could have carried further, i. e., until such time as the polymer yield decreased substantially by reason of the lack of reactants, the effect of maintaining a constant reactant composition is well illustrated in 3 additions utilized. The uniformity of the polymer product was judged by the specific gravity thereof, since it was known that if the specific gravity did not change markedly with yield, the composition of the product would be uniform. The results are given in the following table, together with those obtained when no periodic addition of alpha methyl styrene was made.

| Total Weight of Reactants (grams) | 400 | 400 | 400 |
|---|---|---|---|
| Original Charge: | | | |
| isobutylene, percent | 86.0 | 86.6 | 82.0 |
| alpha methyl styrene, percent | 11.0 | 10.4 | 15.0 |
| isoprene, percent | 3.0 | 3.0 | 3.0 |
| Initial catalyst addition (grams) | 30.0 | 30.0 | 56.0 |
| Cut #1: | | | |
| Alpha methyl styrene addition (grams) | 13.0 | 12.6 | 0.0 |
| catalyst addition (grams) | 65.0 | 65.0 | 53.0 |
| Percent polymer yield | 8.0 | 12.4 | 4.1 |
| specific gravity of polymer | 0.985 | 0.975 | >1.0 |
| Cut #2: | | | |
| alpha methyl styrene addition (grams) | 12.5 | 12.1 | 0.0 |
| Catalyst addition (grams) | 30.0 | 30.0 | 38.0 |
| Percent polymer yield | 12.8 | 22.6 | 23.2 |
| specific gravity of polymer | 0.976 | 0.969 | 0.985 |
| Cut #3: | | | |
| alpha methyl styrene addition (grams) | 12.0 | 11.7 | 0.0 |
| Catalyst addition (grams) | 25.0 | 25.0 | 32.0 |
| Percent polymer yield | 17.0 | 33.0 | 29.3 |
| specific gravity of polymer | 0.982 | 0.972 | 0.956 |

From the above data, it will be evident that the periodic addition of alpha methyl styrene, the most reactive component, resulted in the production of polymers of the same relative composition at all yields. The addition of alpha methyl styrene in these examples was made on the basis of its being removed by reaction about 5.5 times as rapidly as isobutylene. Except for the excess catalyst required in the early stages of the polymerization, the alpha methyl styrene addition was equal to 0.012 parts of alpha methyl styrene per part of alpha methyl styrene in the original reaction mixture per part of 1% aluminum chloride in ethyl chloride solution injected. In the last example, when no periodic addition of alpha methyl styrene was made, the composition of the polymer changed progressively during the reaction, as evidenced by the marked decrease in specific gravity.

The method of the present invention may be applied to various starting mixtures, so long as the addition of the most reactive component is correctly balanced to maintain a substantially constant reaction mixture composition. Thus it is possible to prepare a series of uniform polymers of different physical properties from different starting mixtures. Not only may mixtures of dissimilar olefin hydrocarbons be copolymerized in accordance with this invention, but also mixtures of polymerizable olefins such as polystyrenes with acrylic acid esters or methacrylic acid esters, isobutylene with isoprene or chloroprene or cyclopentadiene, iso-olefin was di-isoalkenyl aromatic hydrocarbons, i. e., isobutylene with di-isobutenyl benzene, styrene with isobutylene, and in many other cases where the composition of the final product may be influenced by the differences in reactivity of the components.

I claim:

In a method for copolymerizing alpha methyl styrene, isoprene, and isobutylene in solution in about 1.5 volumes of ethyl chloride at a temperature of about −110° C. in the presence of a 1% solution of aluminum chloride in ethyl chloride, the ratio of the reactant monomers being about 10:3:87, to produce a copolymer of uniform composition and physical properties, the improvement which comprises adding to the reactant mixture as the copolymerization progresses, additional amounts of aluminum chloride and sufficient alpha methyl styrene to maintain a reactant mixture of substantially constant composition, the alpha methyl styrene addition being equal to 0.012 part of alpha methyl styrene per part of alpha methyl styrene in the original reaction mixture per part of 1% aluminum chloride in ethyl chloride added.

JOHN C. REID, JR.

REFERENCES CITED

The following references are of record in the file of this patent:

UNITED STATES PATENTS

| Number | Name | Date |
|---|---|---|
| 1,896,491 | Luther | Feb. 7, 1933 |
| 2,100,900 | Fikentscher | Nov. 30, 1937 |
| 2,398,976 | Thomas | Apr. 23, 1946 |
| 2,400,036 | Wooddell | May 7, 1946 |
| 2,438,340 | Johnson | Mar. 23, 1948 |

FOREIGN PATENTS

| Number | Country | Date |
|---|---|---|
| 106,371 | Australia | Jan. 26, 1939 |